(12) United States Patent
Zoricak et al.

(10) Patent No.: US 10,647,588 B2
(45) Date of Patent: May 12, 2020

(54) SYNTHESIS OF MAGNESIUM DICHLORIDE SUPPORT FOR THE AST OFF-LINE ZN CATALYST WITH A PLUG FLOW REACTOR (PFR)

(71) Applicant: NOVA Chemicals (International) S.A., Fribourg (CH)

(72) Inventors: Peter Zoricak, Calgary (CA); Qinyan Wang, Calgary (CA); Holly Ann Severin, Calgary (CA); Mohamed Elamine Aiffa, Calgary (CA); Kevin Dickinson, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 15/776,810

(22) PCT Filed: Dec. 5, 2016

(86) PCT No.: PCT/IB2016/057365
§ 371 (c)(1),
(2) Date: May 17, 2018

(87) PCT Pub. No.: WO2017/098398
PCT Pub. Date: Jun. 15, 2017

(65) Prior Publication Data
US 2018/0327273 A1    Nov. 15, 2018

Related U.S. Application Data

(60) Provisional application No. 62/265,034, filed on Dec. 9, 2015.

(51) Int. Cl.
*B01J 21/10*    (2006.01)
*B01J 27/10*    (2006.01)
*C01F 5/30*     (2006.01)
*B01J 27/138*   (2006.01)
*B01J 19/18*    (2006.01)
*B01J 21/06*    (2006.01)
(Continued)

(52) U.S. Cl.
CPC ............... *C01F 5/30* (2013.01); *B01J 19/18* (2013.01); *B01J 21/063* (2013.01); *B01J 27/138* (2013.01); *B01J 37/0207* (2013.01); *C08F 4/655* (2013.01); *C08F 4/65916* (2013.01); *C08F 10/02* (2013.01); *C08F 210/16* (2013.01); *B01J 2219/00481* (2013.01); *C01P 2002/72* (2013.01)

(58) Field of Classification Search
CPC ........ B01J 19/18; B01J 21/063; B01J 27/138; B01J 2219/00481; C01F 5/30; C08F 4/655; C08F 4/65916; C08F 10/02; C08F 210/16
USPC ......................................................... 502/226
See application file for complete search history.

(56) References Cited

U.S. PATENT DOCUMENTS 4,487,846 A * 12/1984 Bailly .................... C08F 10/00
                                                          502/154
4,721,763 A   1/1988 Bailly et al.
(Continued)

FOREIGN PATENT DOCUMENTS

WO    2016/024176 A1    2/2016

*Primary Examiner* — Patricia L. Hailey
(74) *Attorney, Agent, or Firm* — Julie L. Heinrich

(57) ABSTRACT

The various embodiments of the invention provide, a magnesium dichloride support and the magnesium titanium polymerization procatalyst made therefrom, and methods for making and using the same.

18 Claims, 6 Drawing Sheets

(51) Int. Cl.
*B01J 37/02* (2006.01)
*C08F 4/655* (2006.01)
*C08F 4/659* (2006.01)
*C08F 10/02* (2006.01)
*C08F 210/16* (2006.01)

(56) References Cited

U.S. PATENT DOCUMENTS 5,589,555 A 12/1996 Zboril et al.
2016/0046745 A1* 2/2016 Wang .................. C08F 210/16
524/855

* cited by examiner

SYNTHESIS OF MAGNESIUM DICHLORIDE SUPPORT FOR THE AST OFF-LINE ZN CATALYST WITH A PLUG FLOW REACTOR (PFR)

Magnesium-titanium catalysts for olefin polymerization are in wide commercial use. In general, these catalysts comprise a magnesium halide component (typically, magnesium dichloride) and a titanium component that is deposited on the magnesium dichloride.

The resulting magnesium-titanium complex is often referred to as a "procatalyst" because it requires a co-catalyst or an activator to produce a highly active polymerization catalyst system.

The procatalyst may be first synthesized then added to the polymerization reactor at a later time ("off-line"). Alternately, the procatalyst may be prepared by an 'in-line mixing technique' (adjacent to a polymerization reactor) and added directly to the reactor.

Off-line synthesized Zeigler Natta (ZN) catalyst may include the highly disordered form of $MgCl_2$. At lab scale this may be achieved by rapidly forming the $MgCl_2$ by quickly adding t-butyl chloride (tBuCl) to butylethyl magnesium (BEM) in a stirred vessel. This process results in a rapid and highly exothermic reaction. At lab scale this rapid reaction can be controlled by judicious selection of reagent concentrations. In situations where concentrations and reaction scales are increased (to make the process more economical and commercially viable) rapid reagent addition is less desirable for safety considerations. To enable rapid $MgCl_2$ formation at any scale and concentration an alternative process is desired.

Provided herein are methods of making $MgCl_2$ comprising combining $MgR_2$ and reactive organic chloride or HCl and a solvent selected from $C_{5-12}$ alkanes in a PFR reactor, wherein each R is independently selected from $C_{2-8}$ alkyl radicals, and operating the reactor at conditions sufficient to create a disordered form of $MgCl_2$.

Also provided herein is a disordered form of $MgCl_2$ made by the process comprising combining $MgR_2$ and reactive organic chloride or HCl and a solvent selected from $C_{5-12}$ alkanes in a PFR reactor, wherein each R is independently selected from $C_{2-8}$ alkyl radicals, and operating the reactor at conditions sufficient to create the disordered form of $MgCl_2$.

Also provided herein are methods for making a Ziegler Natta catalyst comprising combining $MgR_2$ and reactive organic chloride or HCl and a solvent selected from $C_{5-12}$ alkanes in a PFR reactor, wherein each R is independently selected from $C_{2-8}$ alkyl radicals; operating the PFR reactor to create the disordered form of $MgCl_2$; contacting the $MgCl_2$ support with $^iBuAlCl_2$, $TiCl_4$ and $Et_2AlOEt$ to form the (pro)catalyst.

Also provided herein are methods for making polyethylene polymers and copolymers comprising combining $MgR_2$ and reactive organic chloride or HCl and a solvent selected from $C_{5-12}$ alkanes in a PFR reactor, wherein each R is independently selected from $C_{2-8}$ alkyl radicals; operating the PFR reactor to create the disordered form of $MgCl_2$; contacting the $MgCl_2$ support with $^iBuAlCl_2$, $TiCl_4$ and $Et_2AlOEt$ to form the (pro)catalyst; contacting the procatalyst of the previous step with ethylene, and optionally an alpha-olefin and operating the reactor to create the desired polyethylene.

Also provided herein is an ethylene polymer or copolymer product prepared by the processes described herein.

Figure 1:
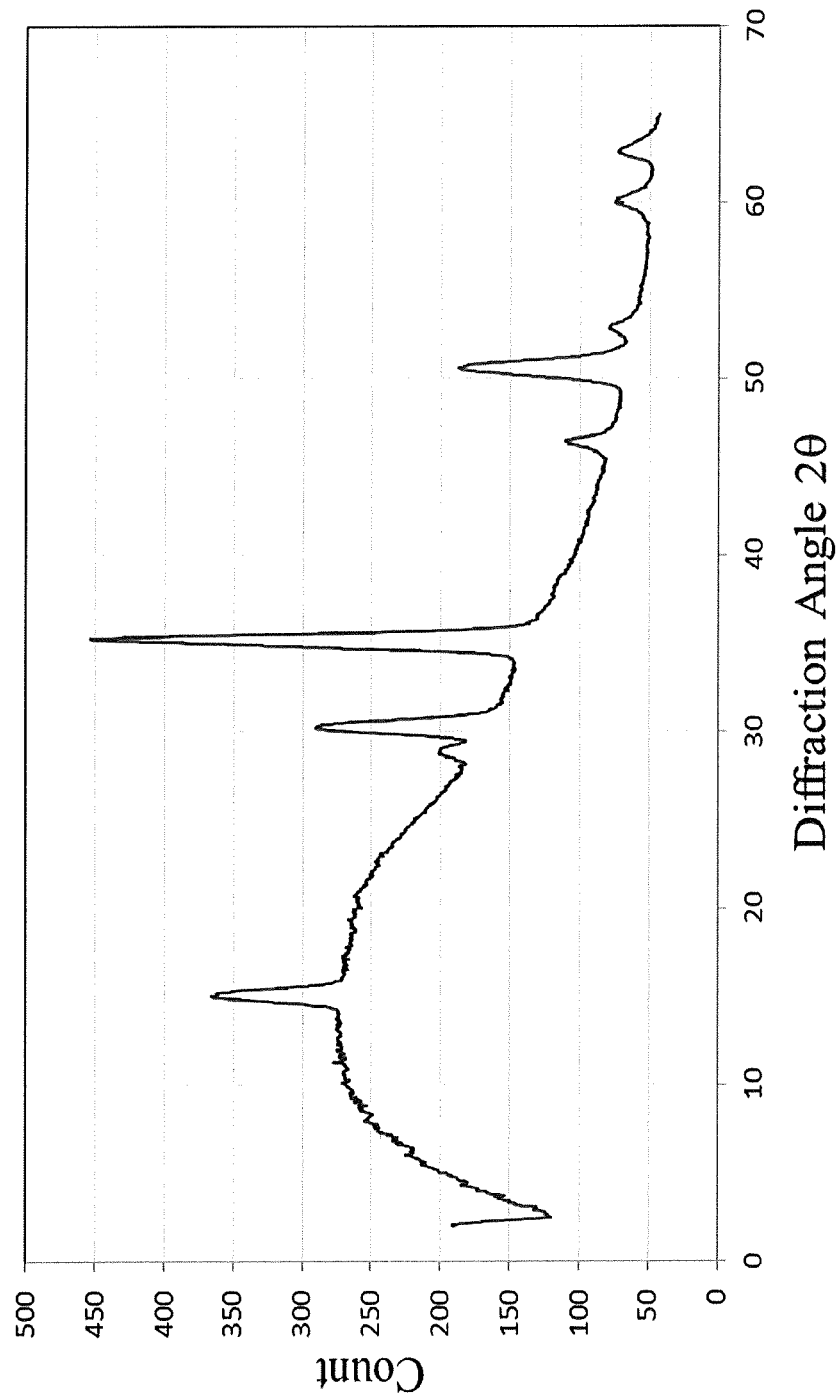
FIG. 1 shows the XRD for anhydrous alpha $MgCl_2$.

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

It must be noted that as used herein, and in the appended claims, the singular forms "a", "an" and "the" include plural references unless the context clearly dictates otherwise.

Unless defined otherwise, all technical, and scientific terms used herein have the same meanings as commonly understood by one of ordinary skill in the art to which this invention belongs.

The terms "alkyl" "alkyl group" and "alkyl radical" can be used interchangeably and refer to saturated monovalent straight or branched chain and cyclic hydrocarbyl groups or radicals bonded to one or more other moieties. For example, the alkyl could be bonded to an oxygen atom to form an alkoxy group, or to a metal as part of or as the ligand on that metal. The term "alkyl" is exemplified by groups such as methyl, ethyl, n-propyl, iso-propyl, n-butyl, t-butyl, n-pentyl, adamantyl, cyclopropyl, cyclobutyl, cyclopentyl, cyclohexyl, cyclooctyl, and the like.

The term "alkanes" refers to non-aromatic, saturated hydrocarbon molecules with the general formula $C_nH_{(2n+2)}$, wherein n is an integer. Alkanes, for example, may be used as solvents or gas feeds.

When a term is preceded by $C_{x-y}$, where x and y are integers, the group is limited to from x to y carbon atoms within the group, excluding any substituents referred to as substituting groups. For example, the $C_{1-5}$ alkyl radicals would include (but not be limited to) methyl, iso-propyl, n-butyl, t-butyl, cyclopropyl, and cyclopentyl radicals, where $C_{1-5}$ alkane would include (but not be limited to) methane, ethane, pentane, cyclopentane, and the like.

The term "halogen radical" or "halogen" or "halo" can be used interchangeably and refer to fluoride, chloride, bromide or iodide groups.

Figure 3:
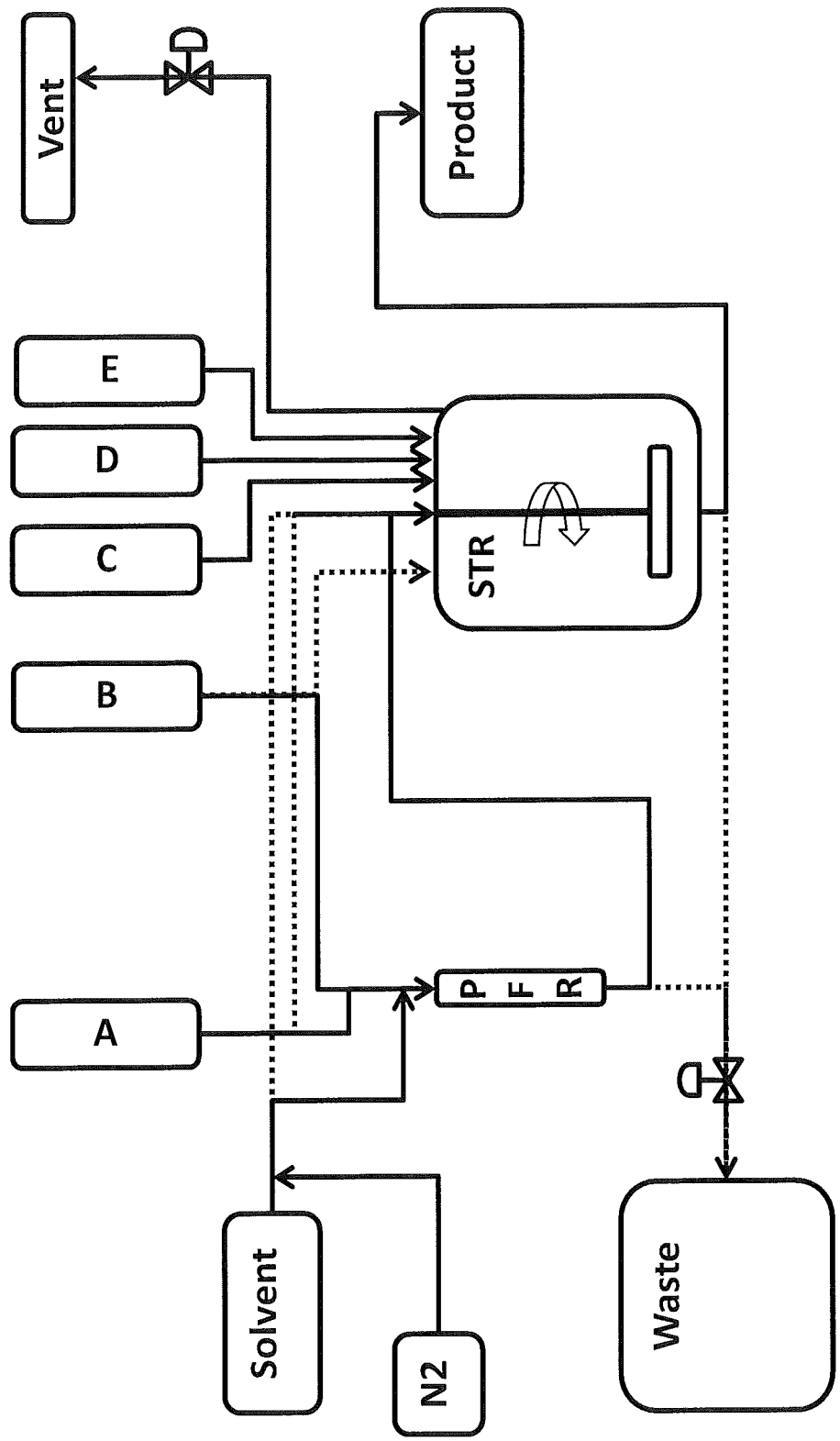
FIG. 3 shows catalyst scale up unit configuration, showing the PFR and STR connected in series.

Batch Ziegler catalyst synthesis is dependent on many factors to ensure high activity. To achieve the desired $MgCl_2$ support particle size and morphology, $MgCl_2$ can be formed rapidly by controlling the rate of addition of reactants in the reaction mixture, a process often accompanied by a large reaction exotherm that can become dangerous as reaction sizes are scaled up. One practical way to achieve rapid $MgCl_2$ formation, but under more controlled conditions is to use a plug flow reactor (labeled as PFR in FIG. 3).

Catalysts made in the PFR or STR (labeled as STR in FIG. 3) showed different polymerization activities when tested at the pilot plant with the PFR catalyst having, in one embodiment, approximately 10% higher activity than catalyst made in the STR only.

PFR REACTOR Discussion

It has been shown that fast mixing of concentrated reagents, e.g. one shot addition, in laboratory scale experiments produces a more active catalyst than when the same preparation is used with slow mixing, e.g. dropwise addition.

Chemical reaction with end products dependent on mixing rates is understood by those knowledgeable in the art to mean that there are competing reactions (for example parallel reactions). In these cases it is also understood that the end product composition and yield will depend not only on the mixing rate but on the type of reactor. Reactors are often described or classified based on which ideal reactor type the reactor most closely resembles. The three most common ideal reactor types considered for classification are the continuous flow stirred tank reactor (CSTR), batch or semi-batch reactor (BR or SBR) and plug flow reactor (PFR).

It has been found that addition of the second reagent quickly to the first reagent already in a stirred reaction vessel (similar to an ideal batch reactor) results in a more active catalyst vs. slow addition of the second reagent to the same stirred reaction vessel (similar to an ideal semi-batch reactor).

A batch reactor which utilizes the fast addition of all reacting species with fast mixing, resulted in a more active catalyst relative to a semi-batch reactor with slow addition of one reagent; however, due to the heat of reaction and the high reactant concentrations, as the reaction volume increases, control of the reaction temperature becomes increasingly difficult. It is expected that this is due to the well-known difficulty with reactor scale-up that the surface area per unit volume decreases with increasing size.

First reagent, as discussed in paragraph 30, can be described as any magnesium dialkyl compound soluble in an aliphatic solvent, such as butylethylmagnesium (BEM) in heptane.

The second reagent, as discussed in paragraph 30, can be described as any organic chloro compound which reacts with the magnesium dialkyl to form magnesium dichloride.

Larger scale production may instead be performed in a PFR. One benefit of the PFR is that good heat transfer is possible via jacketing (or some other means) to cool the tubular reactor.

Fast mixing at the reactant introduction location on a PFR is achievable with the use of a static mixer(s). At low reactor sizes and flow rates (for example the laminar flow regime), mixing is also enhanced by static mixers: so that even in laminar conditions, good radial mixing can be achieved. Here, good radial mixing is defined as sufficient mixing that there is no detrimental impact to the reaction products. The static mixers should be chosen appropriate to the flow conditions. Different static mixer designs typically are intended for laminar, transitional or turbulent flow. Examples of appropriate static mixers in the laminar flow regime include helical or twisted ribbon mixers known under brand names such as the Kenics KMS or Koch/Sulzer KHT.

Figure 4:
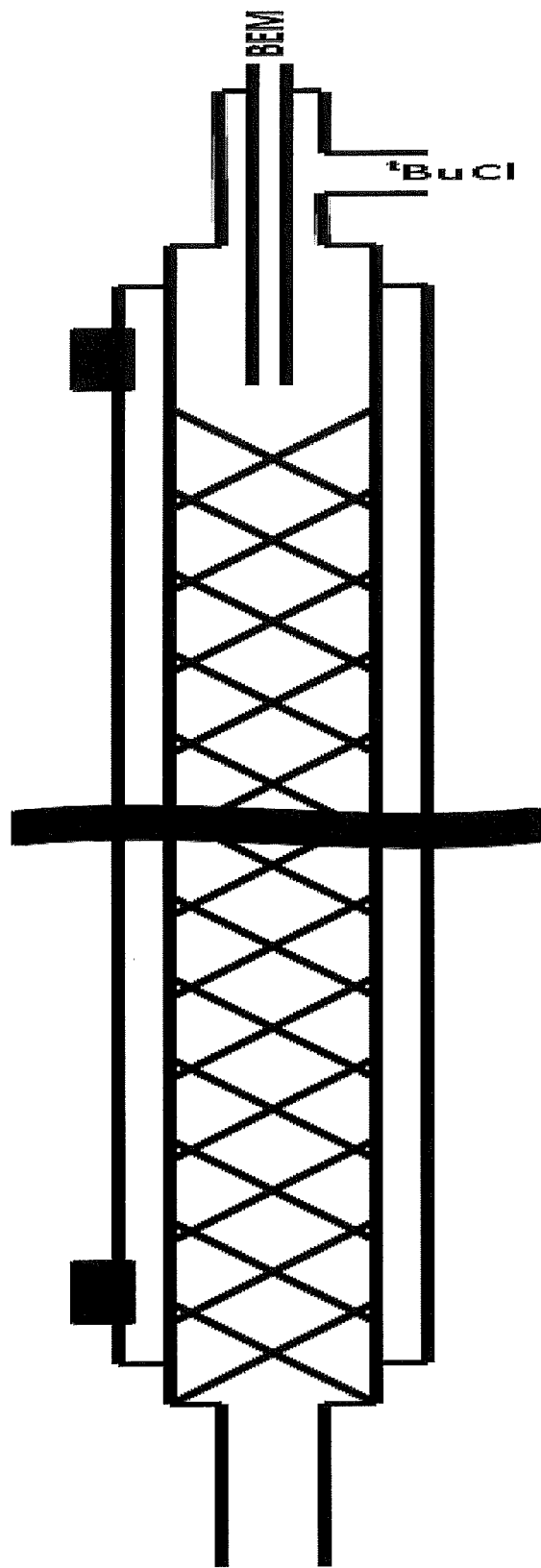
FIG. 4 shows the configuration of the plug flow reactor (PFR) used in the examples.

A plug flow reactor (PFR) useful for the embodiments described herein is made up of a stainless steel tube with a twisted ribbon style static mixer insert. The reactor tubing diameter should be selected for the target scale, ease of construction and to minimize chances of plugging. Depending on the scale of reaction and hold-up time (HUT) required, the PFR diameter and length can vary. PFR can be any size, for example at laboratory scale the PFR may have a diameter as small as ¼ inch and at commercial scale it can be several feet in diameter. The length of the reaction zone, for the PFR used in the examples, is 70 cm which results in a 60 mL reactor volume and ~5 min. HUT. Temperature control is achieved by an outer jacket made up of, for example, a ½ inch tube and connected to a recirculating heater/chiller bath. BEM is introduced to the PFR through a ⅛ inch line that extends into the inch temperature controlled section of the PFR (see FIG. 4). The PFR is used in a vertical orientation with reagents added from top and product withdrawn from the bottom. During start-up the PFR is full of solvent and as the reaction starts the solvent is replaced by $MgCl_2$ reaction product. Initial clean solvent and product is directed to waste until steady state conditions in the PFR are achieved at which point the $MgCl_2$ product is collected in the STR. In one embodiment, the PFR is used for making $MgCl_2$ and the rest of the catalyst synthesis is completed in the STR.

Semi-Batch Reactor for Making $MgCl_2$

A stirred reactor can be used for some embodiments of the invention, for example, a Parr 2 L reactor with a single upward pumping impeller installed near the bottom of the reactor. Reagents can be added through diptubes and product can be transferred out of the reactor though a bottom drain port. Temperature control may be achieved by use of an external jacket connected to a recirculating heater/chiller bath. For slow addition of reagents, the temperature can be controlled to within ±1° C.; however, during fast addition of reagents, the reaction may be very exothermic and rapid/uncontrollable temperature increase can be greater than 50° C. above target temperature. This issue can be further exacerbated at larger reactor volumes where surface area per unit volume decreases. Uncontrolled reaction exotherms can also lead to rapid pressure increase and other safety concerns.

Use of a PFR reactor allows highly exothermic reaction scale-up in a more controlled environment where adequate heat transfer is possible.

Diorganomagnesium

Diorganomagnesium compounds are well known and are commercially available. Diorganomagnesium compounds may be generally represented by the formula $MgR_2$ wherein each R is selected from the $C_{2-8}$ hydrocarbyl groups. In one embodiment each R is independently selected from linear $C_{2-8}$ alkyl groups including, but not limited to, ethyl, butyl, hexyl and octyl groups. In another embodiment each R is independently selected from $C_{2-4}$ alkyl groups. In another embodiment each R is independently selected from ethyl and butyl groups. In one embodiment $MgR_2$ is selected from butylethyl magnesium (BEM), dibutyl magnesium, and butyloctyl magnesium (BOM). In another embodiment $MgR_2$ is butylethyl magnesium (BEM).

Diorganomagnesium solutions are commercially available materials sold by Albemarle. Other diorganomagnesium compounds include hydrocarbon solutions of butyl ethyl magnesium or dibutyl magnesium (which may optionally be treated with an organoaluminum compound to improve solubility and/or reduce solution viscosity).

In one embodiment the $MgR_2$ is provided in a solvent selected from $C_{5-12}$ alkanes. In one embodiment the solvent is selected from hexane, cyclohexane, decane, heptane, isohexane, and dodecane, and mixtures thereof. In one embodiment the solvent is isohexane. In one embodiment the solvent is decane. In one embodiment the solvent is heptane.

The use of magnesium dichloride in "magnesium-titanium" polymerization catalysts is well known. The $MgCl_2$ is generally regarded as a support for the titanium species.

The reaction of a diorganomagnesium compound with two mole equivalents of chlorine to produce magnesium dichloride is a well-known method to prepare catalyst supports.

Embodiments of the present invention use a magnesium dichloride support that is prepared by the reaction of diorganomagnesium compound (described above) with 2 to 3 mole equivalents of chlorine.

In one embodiment, the chlorine/magnesium ratio in the support is from about 2.15 to about 3.0 per mole of magnesium (based on the amount of magnesium in the starting diorganomagnesium compound), or from about 2.15 to about 2.5.

The source of chlorine reacts substantially spontaneously with the diorganomagnesium and is a reactive organic chloride or HCl. In one embodiment the reactive organic chloride is a $C_{4-10}$ tertiary alkyl chloride. In one embodiment the reactive organic chloride is tertiary butyl chloride. In one embodiment the source of chlorine is HCl.

Reaction temperatures may range from about 20° C. to about 160° C., or from about 40° C. to about 100° C. or from about 50° C. to 90° C. or from about 40° C. to about 90° C.

The $MgCl_2$ species prepared as disclosed herein is in the delta form, as determined by measuring the half-height of peaks of an X-ray diffraction measurement. The delta form is known by those skilled in the art to be a highly disordered mixture of alpha and beta forms of $MgCl_2$. XRD spectroscopy is particularly useful in determining the structure of the $MgCl_2$ support characterized by an X-ray spectrum typical of a structure characterized by rototranslational disorder (see for example G. Natta et al. *J. Polym. Sci.* 1961, 51, 399-410).

FIG. 1 shows the typical XRD spectrum from the alpha form of $MgCl_2$.

Figure 2:
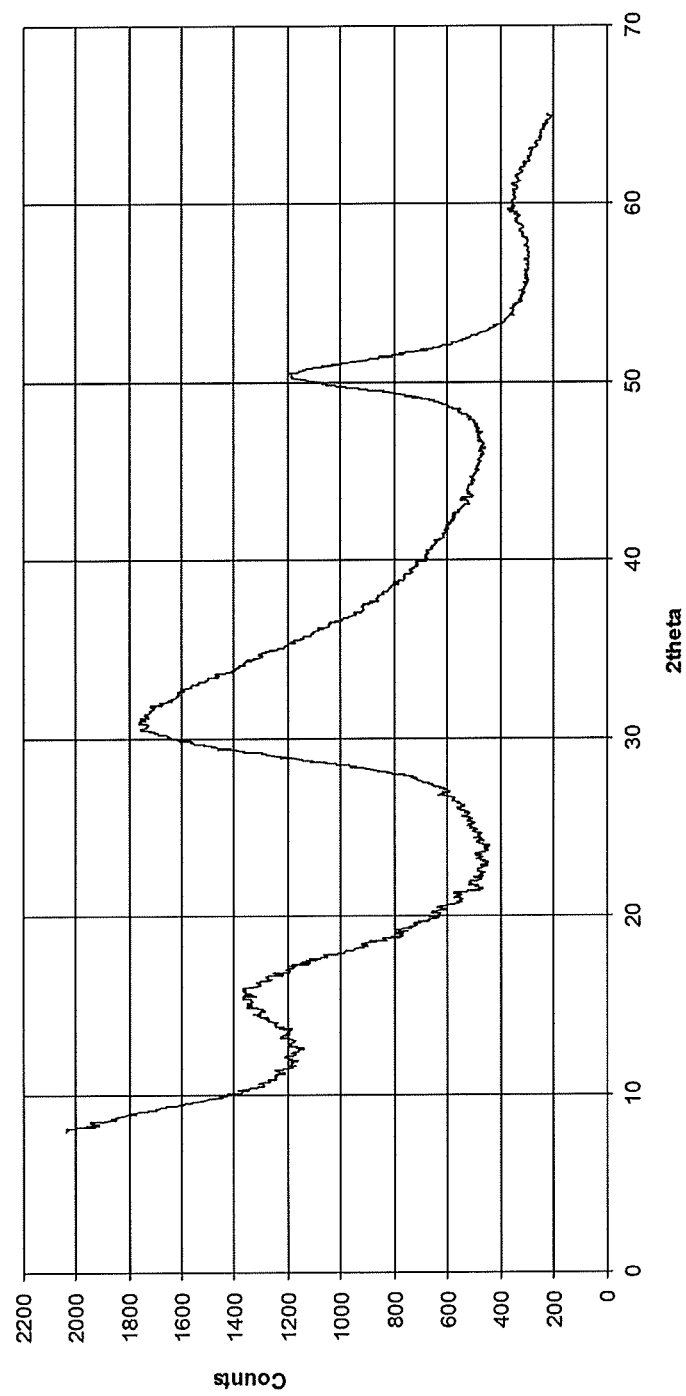
FIG. 2 shows the XRD for the δ-form of $MgCl_2$.

FIG. 2 shows the XRD pattern for the delta form of $MgCl_2$ formed using processes disclosed and claimed herein.

Figure 6:
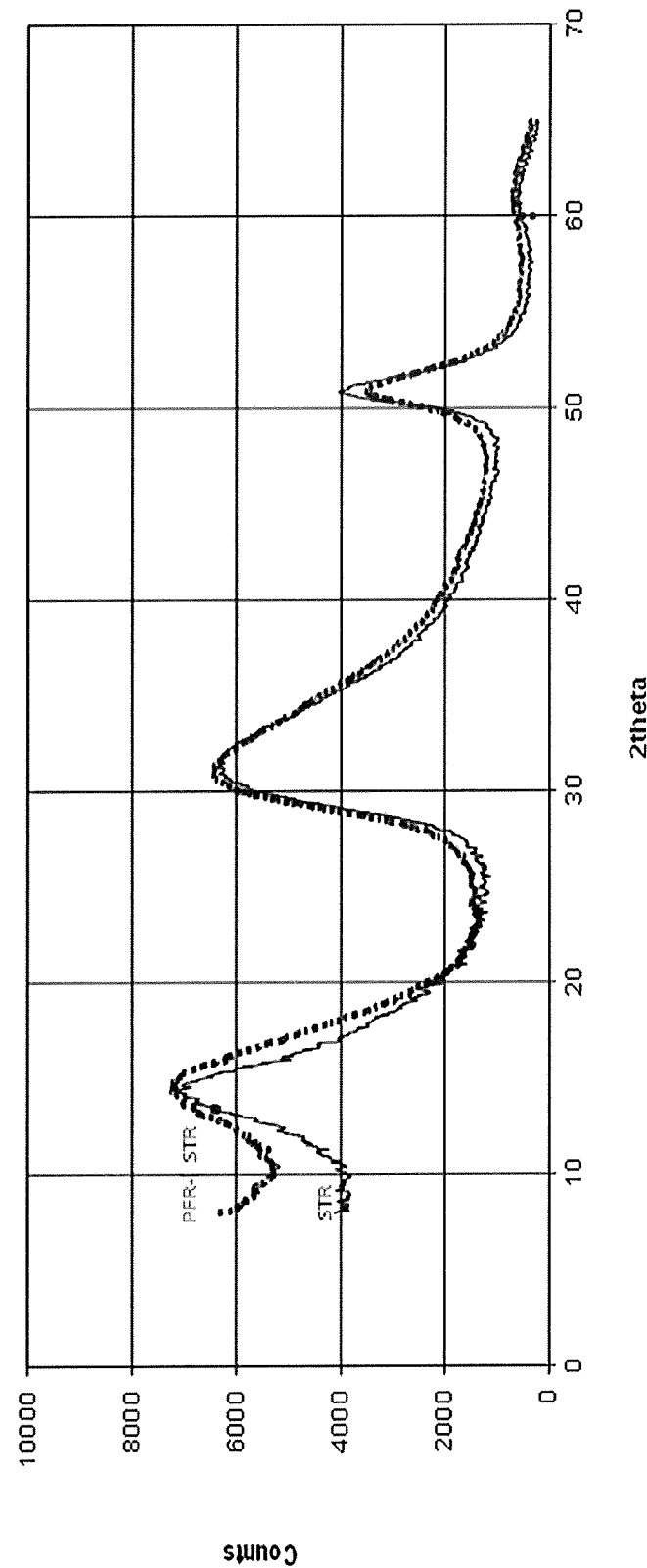
FIG. 6 shows XRD diffraction patterns for $MgCl_2$ made in PFR-STR and STR only.

GADDS, described in more detail in the Examples section below, may also be used to measure the disorder of the $MgCl_2$ species. FIG. 6 shows a comparison of delta-$MgCl_2$ made in a STR and delta-$MgCl_2$ made in a PFR-STR. In some embodiments the disordered form of $MgCl_2$ disclosed herein is characterized by having a peak in the GADDS spectrum at 15 2 theta with a half-height of peaks that is at least 10% greater than the half-height of the peak at 15 2 theta for $MgCl_2$ prepared in a STR. In some embodiments that peak is 12%, or 15%, or 17%, or 20%, or 23%, or 25% greater.

In some embodiments of the invention described herein, an advantage of the processes used to prepare the $MgCl_2$ species allow for the next steps of the procatalyst formation to follow without the need for intervening washing steps if that is desired. The deleterious effects of residual diorganomagnesium starting material are minimized by reacting starting materials to meet the disclosed mole ratios of Cl to Mg or by treatment of the $MgCl_2$ with an additional chlorine source, for example $^iBuAlCl_2$.

The Procatalyst

In one embodiment, the invention described herein is a procatalyst for polymerization of ethylene and α-olefins on a delta form $MgCl_2$ support comprising a $Ti^{3+}$ complex of the formula $TiCl_3*[[R^4]_a[R^5O]_bAlX_{3-c}]_d$ wherein a is 0 to 1; b is 0 to 1; c=a+b; d is from 0.33 to 1.0; each $R^4$ and $R^5$ is independently selected from $C_{1-8}$ alkyl radicals; each X is independently selected from the halogen radicals; and wherein at least 60% of the total Ti present is in the $Ti^{3+}$ oxidation state.

While X can be any halogen, in some embodiments X is Br or Cl. In other embodiments X is Cl.

In some embodiments c is 0. In other embodiments c is 1.

In some embodiments a is 0 and b is 1. In some embodiments a is 1 and b is 0. In some embodiments a is 1 and b is 1. In some embodiments a is 0 and b is 0.

In some embodiments each $R^5$ is $C_{1-4}$ alkyl. In other embodiments, each $R^5$ is ethyl.

In some embodiments each $R^4$ is $C_{1-4}$ alkyl. In other embodiments, each $R^4$ is ethyl.

Magnesium/Titanium Mole Ratio

It will be recognized by those skilled in the art of magnesium-titanium polymerization catalysts that the catalyst activity can be influenced by the magnesium/titanium mole ratio. Preferred mole Mg/Ti ratios are from 5/1 to 10/1 for the catalysts of the present invention, i.e. from 5 to 10 moles of Mg are preferably present per mole of Ti in the catalyst.

In some embodiments, the Mg/Ti molar ratio is from about 5 to about 8. In other embodiments, the Mg/Ti ratio is from about 6 to about 8. The desired Mg/Ti molar ratio can be obtained by preparing the procatalyst according to the methods described herein. The procatalyst formula and ratio of elements contained therein can be determined using standard elemental analysis techniques including but not limited to classical "wet chemistry", neutron activation, Inductively Coupled Plasma-Mass Spectrometry (ICP-MS) and x-ray diffraction spectroscopy (XRD).

In one embodiment the procatalyst is a $Ti^{3+}$ complex of the formula $TiCl_3*[OEtAlCl_2]_d$, and the Mg/Ti molar ratio is from about 5 to about 8. In another embodiment the procatalyst is a $Ti^{3+}$ complex of the formula $TiCl_3*[ClAlCl_2]_d$, and the Mg/Ti ratio is from about 5 to about 8. In some embodiments, partially alkylated versions of $TiCl_3*[ClAlCl_2]_d$ or $TiCl_3*[OEtAlC_2]_d$ may be present.

Another embodiment of the invention described herein provides a process to prepare an olefin polymerization procatalyst comprising a $Ti^{3+}$ complex, said process comprising: a) forming a delta form $MgCl_2$ species by combining i) $R_2Mg$ in a solvent selected from $C_{5-12}$ alkanes, and ii) reactive organic chloride or HCl; wherein each R is independently selected from $C_{2-8}$ alkyl; and wherein the mole ratio of added Cl to Mg is from about 2.0 to about 3.0; then alternatively adding either b) to said delta form $MgCl_2$ species prepared in step a) an alkyl aluminum halide of the formula $R^1{}_xAlX_{3-x}$ and a tetravalent titanium compound in any order or at the same time, to provide a Al/Ti molar ratio is from about 3 to about 10; or c) to said delta form $MgCl_2$ species prepared in step a) an aluminum alkyl halide of the formula $R^1{}_xAlX_{3-x}$ first and a tetravalent titanium compound second, then an alkyl aluminum alkoxide of the formula $R^4{}_yAlOR^5{}_{3-y}$ in a final addition step, wherein the Al/Ti molar ratio when measuring Al supplied from $R^1{}_xAlX_{3-x}$ is from about 0.7 to about 2 and the Al/Ti molar ratio when measuring Al supplied from $R^4{}_yAlOR^5{}_{3-y}$ is from about 1 to about 2; and further wherein the Mg/Ti molar ratio is from about 5 to about 10, x is 1 or 2, y is 1 or 2, each $R^1$ is independently selected from $C_{1-8}$ alkyl, the tetravalent titanium compound is selected from $TiR^2X_3$, $Ti(OR^3)X_3$, $TiX_4$, and mixtures thereof, each X is independently selected from the halogens, each $R^2$ is independently selected from $C_{1-8}$ alkyl and benzyl, and each $R^3$, $R^4$ and $R^5$ are independently selected from $C_{1-8}$ alkyl.

Another embodiment of the invention described herein provides a procatalyst product prepared by a process comprising: a) forming a delta form $MgCl_2$ species by combining i) $R_2Mg$ in a solvent selected from $C_{5-12}$ alkanes, and ii) reactive organic chloride (RCl) or HCl; wherein each R is independently selected from $C_{2-8}$ alkyl; and wherein the mole ratio of Cl to Mg added is from about 2.0 to about 3.0; then alternatively adding either b) to said delta form $MgCl_2$ species prepared in step an alkyl aluminum halide of the formula $R^1{}_xAlX_{3-x}$ and a tetravalent titanium compound in any order or at the same time, wherein the Al/Ti molar ratio is from about 3 to about 10; or c) to said delta form $MgCl_2$ species prepared in step a) an aluminum alkyl halide of the formula $R^1{}_xAlX_{3-x}$ first and a tetravalent titanium compound second, then an alkyl aluminum alkoxide of the formula $R^4{}_yAlOR^5{}_{3-y}$ in a final addition step, wherein the Al/Ti molar ratio when measuring Al supplied from $R^1{}_xAlX_{3-x}$ is from about 0.7 to about 2 and the Al/Ti molar ratio when measuring Al supplied from $R^4{}_yAlOR^5{}_{3-y}$ is from about 1 to about 2; and further wherein the Mg/Ti molar ratio is from about 5 to about 10, x is 1 or 2, y is 1 or 2, each $R^1$ is independently selected from $C_{1-8}$ alkyl, the tetravalent titanium compound is selected from $TiR^2X_3$, $Ti(OR^3)X_3$, $TiX_4$, and mixtures thereof, each X is independently selected from the halogens, each $R^2$ is independently selected from $C_{1-8}$ alkyl and benzyl, and each $R^3$, $R^4$ and $R^5$ are independently selected from $C_{1-8}$ alkyl.

Titanium IV Source

The procatalyst described herein is then prepared by depositing a titanium compound on the above described magnesium chloride support. The starting titanium (IV) compound may be selected from compounds of the formula $TiR^2X_3$, $Ti(OR^3)X_3$, $TiX_4$, and mixtures thereof, wherein each $R^2$ is selected from $C_{1-8}$ alkyl and benzyl, and $R^3$ is selected from $C_{1-8}$ alkyl and each X is independently a halogen.

In some embodiments the halogen is selected from chlorine and bromine. In other embodiments the halogen is chlorine. In some embodiments $R^3$ is selected from $C_{1-4}$ alkyl. In other embodiments $R^3$ is selected from ethyl, isopropyl, and t-butyl.

In some embodiments $R^2$ is selected from $C_{1-4}$ alkyl. In other embodiments, $R^2$ is selected from ethyl and isobutyl. In some embodiments $R^2$ is benzyl. In some embodiments, the tetravalent titanium compound is $Ti(OCH_2CH_3)Cl_3$, or $Ti(CH_2CH_3)Cl_3$. In some embodiments, the tetravalent titanium compound is selected from $TiCl_2Br_2$ and $TiCl_4$. In some embodiments, the tetravalent titanium compound is $TiCl_4$.

It will be understood by those skilled in the art that the $TiR^2X_3$, $Ti(OR^3)X_3$, $TiX_4$ species may be purchased or alternatively may be prepared by well-known reactions with commercially available and inexpensive alkyl titanium and alkoxy titanium compounds, such as $Ti(R^2)_2X_2$, $Ti(R^2)_3X_1$, $Ti(OR^3)_2X_2$, or $Ti(OR^3)_3X_1$, where each X, $R^2$ and $R^3$ are as described herein above.

The Aluminum Species

The aluminum compounds used in the methods described herein are purchased commercially from companies such as Albemarle, Sigma-Aldrich, or Fisher Chemical.

The $R^1{}_xAlX_{3-x}$ is used to halogenate the dialkylmagnesium compounds and the Grignard reagent and is added in the molar ratio amount specified above to minimize excess halogen in the solution and to minimize over reduction of the Ti species.

In some embodiments x is 1. In other embodiments x is 2.

In some embodiments each $R^1$ is independently selected from methyl, ethyl, propyl, isopropyl, butyl, and isobutyl. In other embodiments each $R^1$ is independently ethyl and isobutyl.

While X can be any halogen, in some embodiments, X is Cl or Br. In other embodiments, X is Cl.

In one embodiment of the process of making the procatalysts described herein $R^1{}_xAlX_{3-x}$ is selected from isobutylaluminum dichloride (IBADC), and ethylaluminumdichloride (EADC).

The $R^4{}_yAlOR^5{}_{3-y}$ is used to reduce the titanium species to the desired oxidation state and/or may react with excess halide. In addition, this compound may act as an activator for the polymerization reactions disclosed herein below.

The $R^1{}_xAlX_{3-x}$ described above can be used in addition to the $R^4{}_yAlOR^5{}_{3-y}$ species as a reducing agent. Other reduction agents include $AlR^*_3$, $AlR^*_2X$, to $AlR^*_1X_2$, where $R^*$ is $C_{2-8}$ alkyl groups. While $R^*$ may be higher alkyl groups, such aluminum species are not as commercially desirable. In some embodiments of the process of making the procatalysts described herein $R^1{}_xAlX_{3-x}$ is triisobutyl aluminum.

In some embodiments y is 2. In some embodiments y is 1.

In some embodiments each $R^4$ and $R^5$ are independently selected from $C_{1-4}$ alkyl. In other embodiments each $R^4$ and $R^5$ is ethyl.

In one embodiment of the process of making the procatalysts described herein $R^4{}_yAlOR^5{}_{3-y}$ is diethylaluminumethoxide (DEAL-E).

The preparation of the procatalyst by the subsequent additions of the aluminum and titanium species to the $MgCl_2$ species can be accomplished by alternative pathways. In one embodiment, reduction of the titanium species from $Ti^{4+}$ to $Ti^{3+}$ is accomplished using an $R^1{}_xAlX_{3-x}$ compound added in any order to or with the titanium compound. In some embodiments of this pathway, the Al/Ti molar ratio is from about 4 to 7. In other embodiments of this pathway, Al/Ti ratio is about 5.

In another alternative pathway, the titanium species is added after a smaller amount of the $R^1_xAlX_{3-x}$ compound (as compared to the amount of $R^1_xAlX_{3-x}$ compound used in the previously discussed pathway). The reduction to the $Ti^{3+}$ species is completed by the addition of the $R^4_yAlOR^5_{3-y}$ compound. In some embodiments of this pathway, the Al/Ti molar ratio is from about 1 to about 1.8 when measuring Al supplied from $R^1_xAlX_{3-x}$. In other embodiments of this pathway, the Al/Ti molar ratio is about 1 when measuring Al supplied from $R^1_xAlX_{3-x}$. In some embodiments of this pathway, the Al/Ti molar ratio is from about 0.7 to about 1.7, or from about 1.5 to 1.7, when measuring Al supplied from $R^4_yAlOR^5_{3-y}$. In other embodiments of this pathway, the Al/Ti molar ratio is about 1.67 when measuring Al supplied from $R^4_yAlOR^5_{3-y}$.

In either pathway discussed the reaction may be carried out at a temperature between about 40° C. and 90° C., or about 40° C. and about 70° C., or between about 45° C. and about 55° C. or at a temperature of about 50° C.

Electron Donors

The use of electron donors is well known in the art of magnesium-titanium based olefin polymerization catalysts. The optional use of an electron donor is encompassed by this invention. However, it is preferred not to use an electron donor when the catalyst is used under solution polymerization conditions. Suitable electron donors are well known to those skilled in the art and include tetrahydrofuran (THF), dimethyl formamide, ethyl acetate, methyl isobutyl ketone and various phthalates.

Activators

Any "activator" which activates the above described magnesium/titanium procatalyst for olefin polymerization may be employed in the present invention.

Exemplary activators include aluminoxanes and organoaluminum cocatalyst.

The aluminoxane may be of the formula:

$(R^6)_2AlO(R^6AlO)_mAl(R^6)_2$ wherein each $R^6$ is independently selected from the group consisting of $C_{1-20}$ hydrocarbyl radicals and m is from 0 to 50, preferably $R^6$ is a $C_{1-4}$ alkyl radical and m is from 5 to 30. Methylaluminoxane (or "MAO") in which each $R^6$ is methyl is the preferred aluminoxane.

Aluminoxanes are well known as cocatalysts, particularly for metallocene-type catalysts. Aluminoxanes are also readily available articles of commerce.

The use of an aluminoxane cocatalyst generally requires a mole ratio of aluminum to the transition metal in the catalyst from 25:1 to 1000:1. Example ratios useful in the methods disclosed herein are from 5:1 to 10:1.

In some embodiments, preferred organoaluminum compounds include triethyl aluminum, triisobutyl aluminum and diethyl-aluminum ethoxide. When using these organoaluminum activators, exemplary Al/Ti ratios are from 0.5/1 to 10/1, based on the moles of Ti in the procatalyst. Solution polymerization processes are preferably conducted with a comparatively low Al/Ti mole ratio (for example, 0.5/1 to 5/1, especially 1/1 to 3/1) while gas phase polymerizations are preferably conducted with comparatively high Al/Ti mole ratios (for example 20/1 to 150/1).

Solution processes for the polymerization and copolymerization of ethylene are well known in the art. These processes are conducted in the presence of an inert hydrocarbon solvent typically a $C_{5-12}$ hydrocarbon, which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The polymerization temperature in a conventional slurry or solution process is from about 80 to about 300° C. (preferably from about 80 to about 120° C. for slurry polymerization and from about 120 to about 250° C. for solution polymerizations). However, as is illustrated in the Examples, the polymerization temperature for the solution process disclosed herein can be above 160° C. The upper temperature limit will be influenced by considerations which are well known to those skilled in the art, such as a desire to maximize operating temperature to reduce solution viscosity, while still maintaining good polymer properties. Increased polymerization temperatures generally reduce the molecular weight of the polymer. In other embodiments, the polymerization temperature can be between about 200 and about 300° C., or about 220 to about 250° C.

One example of a reaction process is a "medium pressure process", meaning that the pressure in the reactor is preferably less than about 6,000 psi (about 42,000 kiloPascals or kPa). Pressures can range from about 10,000 to about 40,000 kPa, or from about 2,000 to about 3,000 psi (about 14,000-about 22,000 kPa), or from 725 to about 3,000 psi (about 5,000-about 22,000 kPa).

Suitable monomers for copolymerization with ethylene include $C_{3-20}$ mono- and di-olefins. Example comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornes, alkenyl-substituted norbornes and the like (e.g. 5-methylene-2-norbornene and 5-ethylidene-2-norbornene, bicyclo-(2,2,1)-hepta-2,5-diene).

Co- and ter-polymers of ethylene, and one or more copolymerizable monomers can also be prepared using the methods described herein. In one embodiment such polymers will contain about 50 to about 75 weight % ethylene, preferably about 50 to 60 weight % ethylene and correspondingly from 50 to 40 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

In another embodiment the resulting polymer may comprise not less than about 80, or not less than about 90 weight % of ethylene and up to about 20, or less than 10 weight % of one or more copolymerizable monomers. In some embodiments the comonomers are $C_{3-8}$ alpha olefins such as 1-butene, 1-hexene and 1-octene.

The monomers are dissolved/dispersed in the solvent either prior to being fed to the reactor (or for gaseous monomers the monomer may be fed to the reactor so that it will dissolve in the reaction mixture). Prior to mixing, the solvent and monomers may be purified to remove potential catalyst poisons such as water, oxygen and other polar impurities. The feedstock purification follows standard practices in the art, e.g. molecular sieves, alumina beds and oxygen removal catalysts are used for the purification of monomers. The solvent (e.g. methyl pentane, cyclohexane, hexane or may be treated in a similar manner as well.

The feedstock may be heated or cooled prior to feeding to the reactor.

In some embodiments, the catalyst components may be premixed in the solvent for the reaction or fed as separate streams to the reactor. In some instances premixing it may be desirable to provide a reaction time for the catalyst components prior to entering the reaction.

One embodiment of the invention described herein provides a solution olefin polymerization process comprising i) preparing a procatalyst using the processes described herein above; ii) adding the procatalyst with a solvent selected from $C_{5-12}$ alkanes to one or more reactors in series or in parallel configuration together with ethylene and optionally one or more comonomers selected from $C_{3-8}$ comonomers, hydrogen to a reactor; and iii) adding an aluminum alkyl activator to the reactor in a molar ratio of about 1 to about 10 relative to the amount of procatalyst.

The polymerization processes may also use an aluminum alkyl activator selected from $R^4{}_y AlOR^5{}_{3-y}$, trialkyl aluminum compounds and MAO.

In some embodiments the solvent used in the polymerization processes is selected from hexane, cyclohexane, decane, heptane, isohexane, and dodecane. In other embodiments the solvent is isohexane. In other embodiments the solvent is decane.

In some embodiments a solution polymerization process is performed in a single continuous stirred tank reactor (CSTR) and optionally with one or more additional reactors. In other embodiments a solution process is performed in a dual reactor continuous reactor set up in series or parallel.

The process of this invention can also include the use of a tubular reactor that is connected to the discharge of the at least one CSTR. (For clarity, if two CSTR's are used in series, then the tubular reactor receives the discharge from the second CSTR).

The term "tubular reactor" is meant to convey its conventional meaning—namely a simple tube. The tubular reactor may have a length/diameter (L/D) ratio of at least 10/1. The tubular reactor is not agitated and is operated adiabatically. Thus, as polymerization progresses, the remaining comonomer is increasingly consumed and the temperature of the solution increases (both of which improve the efficiency of separating the remaining comonomer from the polymer solution). The temperature increase along the length of the tubular reactor may be greater than 3° C. (i.e. that the discharge temperature from the tubular reactor is at least 3° C. greater than the discharge temperature from the CSTR that feeds the tubular reactor).

The tubular reactor may have a feed port for additional ethylene and solvent. The feed is "tempered"—i.e. the temperature of the additional ethylene and/or solvent is heated to above ambient (or to about 100° C.) but the temperature is below the discharge temperature of the tubular reactor. In one embodiment, the ethylene is tempered to between about 80° C. to about 200° C. or between about 100° C. and about 200° C. In one embodiment the ethylene is added with solvent. The amount of solvent (expressed as a weight ratio, based on ethylene) is from about 20/1 to about 0.1/1, or from about 10/1 to about 1/1.

Optionally, the tubular reactor may also have feed ports for additional catalyst, cocatalyst, comonomer and/or telomerization agent (such as hydrogen). However, in some embodiments, no additional catalyst is added to the tubular reactor.

The total volume of the tubular reactor may be at least 10 volume % of the volume of the at least one CSTR, or from about 30% to about 200% (for clarity, if the volume of the CSTR is about 1,000 liters, then the volume of the tubular reactor is at least about 100 liters, or from about 300 to about 2,000 liters).

The total amount of ethylene added to the tubular reactor may be from 1 to 50 weight % of the total ethylene added to the CSTR(s). For example, if one CSTR is being operated with an ethylene flow rate of about 1,000 kg/hr, then the ethylene flow to the tubular reactor would be from about 10 to about 500 kg/hr. Similarly, if two CSTR(s) were being operated with an ethylene flow of about 1,000 kg/hr to the first and about 500 kg/hr to the second, then the flow of ethylene to the tubular reactor would be from about 15 to about 750 kg/hr.

In some embodiments the procatalyst is pre-formulated and added directly to the reactor.

In some embodiments the polymerization temperature is at least about 220° C., or at least about 230° C., or at least about 240° C.

In some embodiments the polymerization process using the procatalysts described herein results in a polymer having the same density but where the process uses at least about 10% less comonomer feed compared to a polymerization process using a procatalyst disclosed in U.S. Pat. No. 5,589,555.

In other embodiments the polymerization process using the procatalysts described herein results in a polymer with the same density but with a higher Mw at any polymerization temperature than the Mw obtained for a polymer prepared using a procatalyst disclosed in U.S. Pat. No. 5,589,555.

In some embodiments the reactor hold-up time is from about 30 seconds to about 1 hour. In other embodiments the reactor hold-up time is from about 30 seconds to about 30 minutes. In other embodiments the reactor hold-up time is from about 30 seconds to about 5 minutes. In other embodiments the reactor hold-up time is from about 1 minute to about 5 minutes.

The various embodiments disclosed herein can be used to make polyethylene polymer or copolymers. In some embodiments this invention provides a polyethylene polymer or copolymer having a density from about 0.910 g/cc to about 0.965 g/cc. In some embodiments this invention provides polymers with a $CDBI_{50}$ octene greater than or equal to about 50. Another embodiment of this invention provides a polymer with a MWD from about 3 to about 8, or for example from 3 to 5, or for example 3.5. Yet another embodiment of this invention provides substantially flat comonomer distribution within the final polymer product. Substantially flat comonomer distribution means that a plot of the branch content as a function of molecular weight as plotted on a GPC curve would give a line that is not more than about 15° off horizontal.

In some embodiments the polymer has less than about 10 ppm calculated residual titanium in the resulting polymer. In other embodiments the polymer has less than about 8 ppm calculated residual titanium in the resulting polymer. In other embodiments the polymer has less than about 3 ppm calculated residual titanium in the resulting polymer.

In some embodiments the polymer has less than about 120 ppm calculated residual halogen in the resulting polymer. In other embodiments the polymer has less than about 100 ppm calculated residual halogen in the resulting polymer. In other embodiments the polymer has less than about 60 ppm calculated residual halogen in the resulting polymer.

Another embodiment of this invention provides a polymer as described herein above for use in fabrication methods selected from extrusion, injection molding, thermoforming, and rotational molding.

Another embodiment of this invention provides a polymer as described herein above for use in a plastic articles such as films, fibers, molded or thermoformed articles such as drums and agricultural spray tanks, and pipe coatings.

The present invention will further be described by reference to the following examples. The following examples are merely illustrative of the invention and are not intended to be limiting. Unless otherwise indicated, all percentages are by weight.

EXAMPLES

Analytical Methods

Melt index ("MI") measurements are conducted according to ASTM method D-1238.

Polymer densities are measured using ASTM D-1928.

Polymer molecular weights and molecular weight distributions were measured by gel permeation chromatography (GPC). The instrument (Waters 150-C) was used at 140° C. in 1,2,4-trichlorobenzene and was calibrated using polyethylene standards.

Polymer branch frequencies were determined by FT-IR. The instrument used was a Nicolet 750 Magna-IR spectrophotometer.

X-ray diffraction patterns were collected using a Bruker General Area Detector Diffraction System (GADDS). X-rays were generated using a Cu tube (wavelength of 1.54184 A) set at 30 kV and 30 mA. The sample to detector distance was 5.0 cm. The angle of the detector to the sample (2 theta) was 30°. For data collection, the powdered samples were placed in 1.0 mm ID quartz tubes. The diffraction patterns were background corrected.

GPC-FT-IR: Polymer sample solutions (2 to 4 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a Waters GPC 150C chromatography unit equipped with four Shodex columns (HT803, HT804, HT805 and HT806) using TCB as the mobile phase with a flow rate of 1.0 mL/minute, with a FTIR spectrometer and a heated FTIR flow through cell coupled with the chromatography unit through a heated transfer line as the detection system. BHT was added to the mobile phase at a concentration of 250 ppm to protect SEC columns from oxidative degradation. The sample injection volume was 300 mL. The raw FTIR spectra were processed with OPUS FTIR software and the polymer concentration and methyl content were calculated in real time with the Chemometric Software (PLS technique) associated with the OPUS. Then the polymer concentration and methyl content were acquired and baseline-corrected with the Cirrus GPC software. The SEC columns were calibrated with narrow distribution polystyrene standards. The polystyrene molecular weights were converted to polyethylene molecular weights using the Mark-Houwink equation, as described in the ASTM standard test method D6474. The comonomer content was calculated based on the polymer concentration and methyl content predicted by the PLS technique as described in the published work by P. J. DesLauriers *Polymer* 2002, 43, 159-170.

TREF: A polymer sample (80 to 100 mg) was introduced into the reactor vessel of the Polymer ChAR crystal-TREF unit. The reactor vessel was filled with 35 ml 1,2,4-trichlorobenzene (TCB), heated to the desired dissolution temperature (e.g. 150° C.) for 2 hours. The solution (1.5 mL) was then loaded into the TREF column filled with stainless steel beads. After allowed to equilibrate at a given stabilization temperature (e.g. 110° C.) for 45 minutes, the polymer solution was allowed to crystallize with a temperature drop from the stabilization temperature to 30° C. (0.09° C./minute). After equilibrating at 30° C. for 30 minutes, the crystallized sample was eluted with TCB (0.75 mL/minute) with a temperature ramp from 30° C. to the stabilization temperature (0.25° C./minute). The TREF column was cleaned at the end of the run for 30 minutes at the dissolution temperature. The data were processed using Polymer ChAR software, Excel spreadsheet and TREF software developed in-house.

CDBI is defined to be the percent of polymer whose composition is within 50% of the median comonomer composition. It is calculated from the composition distribution curve and the normalized cumulative integral of the composition distribution curve, as illustrated in U.S. Pat. No. 5,376,439.

For the catalysts described in the examples the plug flow reactor (PFR) is made up of a ½ inch ID stainless steel tube with a static mixer insert. The length of the reaction zone is 70 cm which results in a 60 mL reactor volume. Temperature control is achieved by an outer jacket made up of a inch tube and connected to a recirculating heater/chiller bath. BEM is introduced to the PFR through a ⅛$^{th}$ line that extends into the ½ inch temperature controlled section of the PFR (see FIG. 4). The PFR is installed in a vertical orientation with reagents added from top and product withdrawn from the bottom. During start-up, the PFR is full of solvent and as the reaction starts the solvent is replaced by reaction product. Initial clean solvent and product is directed to waste until steady state conditions in the PFR are achieved at which point the $MgCl_2$ product is collected in the STR. The PFR is only used for making $MgCl_2$ and the rest of the catalyst synthesis is completed in the STR.

Figure 5:
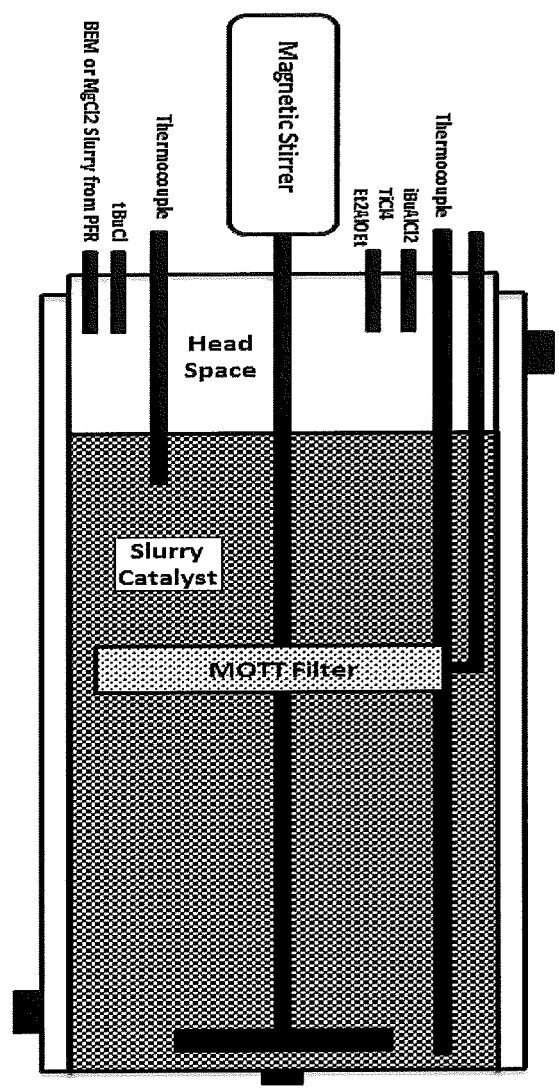
FIG. 5 shows the configuration of the stirred reactor (STR) used in the examples.

The STR used is a jacketed 2 L Parr reactor with a single impeller installed near bottom of the reactor body (see FIG. 5). The reactor is equipped with a bottom drain port for transferring catalyst slurry out of the reactor. A 5 micron sintered stainless steel Mott filter is installed inside the reactor on a diptube to enable in-reactor filtration of the slurry catalyst. Reactor temperature is monitored by two thermocouples in the reactor and controlled by the same heater/chiller bath used for the PFR.

Catalyst 1 (Catalyst Made in PFR/STR)

Into a liquid full PFR, tBuCl (1,500 mM solution in cyclohexane) and BEM (400 mM solution in cyclohexane) were pumped in at 4.9 mL/min. and 8 mL/min. respectively. For first 25 min. the formed $MgCl_2$ was sent to waste until steady state conditions were established in the PFR. Afterwards the $MgCl_2$ slurry was redirected to an empty STR, under 100 psi $N_2$, which was stirring at 600 rpm. Temperature in the PFR and STR were maintained at 50° C. After 93 min. and 1,200 mL of $MgCl_2$ slurry collected, tBuCl and BEM flows were stopped. About 20 mL of $MgCl_2$ solution was subsampled and dried as $MgCl_2$ sample 1 for XRD measurement. While maintaining the reactor at 50° C., $^iBuAlCl_2$ (69.361 mmol in 70 mL of cyclohexane) was added rapidly and the reaction stirred for 15 min. Then $TiCl_4$ (39.628 mmol in 40 mL of cyclohexane) was added and slurry stirred for another 10 min. at 50° C. Finally $Et_2AlOEt$ (66.085 mmol in 40 mL of cyclohexane) was added at 50° C. and then the slurry was heated to 85° C. and stirred for 1 hr. Stirring was stopped and slurry was allowed to settle for 30 min. while cooling to room temperature. Mother liquor was then filtered off using the in-reactor Mott filter. The remaining slurry was diluted with 300 mL of cyclohexane, stirred at 600 rpm for 5 min. and then filtered off with the Mott filter. Cyclohexane wash and filtration was repeated once more with 300 mL of cyclohexane. Resulting catalyst slurry was transferred to a receiving vessel through bottom drain port. Reactor was rinsed with 200 mL of cyclohexane and added to catalyst slurry to give 925 g of isolated catalyst slurry with 0.2065 wt % Ti concentration. Pilot plant quantities of catalyst were made in 4 batches, combined and diluted with cyclohexane. The combined catalyst slurry contained 0.1053 wt % of Ti.

Comparative Catalyst 1 (Catalyst Made in STR Only)

Into an empty STR under 100 psi $N_2$, $^tBuCl$ (1500 mM solution in cyclohexane) and BEM (400 mM solution in cyclohexane) were pumped in at 4.9 mL/min. and 8 mL/min. respectively while stirring at 600 rpm and controlling reactor temperature at 50° C. After 93 min. and 1,200 mL of $MgCl_2$ slurry collected, tBuCl and BEM flows were stopped. About 20 mL of $MgCl_2$ solution was subsampled and dried as $MgCl_2$ sample 2 for XRD measurement. While maintaining the reactor at 50° C., $^iBuAlCl_2$ (69.361 mmol in 70 mL of cyclohexane) was added rapidly and the reaction was stirred for 15 min. Then $TiCl_4$ (39.628 mmol in 40 mL of cyclohexane) was added and slurry and stirred for another 10 min. at 50° C. Finally $Et_2AlOEt$ (66.085 mmol in 40 mL of cyclohexane) was added at 50° C. and then the slurry was heated to 85° C. and stirred for 1 hr. Stirring was stopped and slurry was allowed to settle for 30 min. while cooling to room temperature. Mother liquor was then filtered off using the in-reactor Mott filter. The remaining slurry was diluted with 300 mL of cyclohexane, stirred at 600 rpm for 5 min. and then filtered off with the Mott filter. Cyclohexane wash and filtration was repeated once more with 300 mL of cyclohexane. Resulting catalyst slurry was transferred to a receiving vessel through bottom drain port. Reactor was rinsed with 200 mL of cyclohexane and added to catalyst slurry to give 980 g of isolated catalyst slurry with 0.1936 wt % Ti concentration. Pilot plant quantities of catalyst were made in 2 batches, combined and diluted with cyclohexane. The combined catalyst slurry contained 0.0957 wt % of Ti.

Comparative Catalyst 2 (Catalyst Made in the Lab Using Glassware and Overhead Stirring with Rapid Addition of $^tBuCl$ to $^nBu(Et)Mg$)

This comparative catalyst was made by combining multiple (21) batches of catalyst made using the procedure below.

107.792 g (200 mmol) of 20.5 wt. % BEM was added to approx. 520 mL cold decane from the freezer to a 3,000 mL round bottom flask. The solution was then allowed to heat up to an internal temperature of 20° C. (monitored using a thermowire) while being stirred using an overhead stirrer at 470 rpm. 42.579 g (460 mmol) of tBuCl diluted in 70 mL of decane was added via a dropping funnel to the BEM solution in one shot. After rinsing the funnel once the addition was complete, the solution was allowed to stir for 35 minutes while the solution was heated to 50° C.

After the formation of the $MgCl_2$, 7.029 g (45.3 mmol) of IBADC diluted in 30 mL of decane was added to the $MgCl_2$ at 50° C. using a dropping funnel in one shot. After rinsing the funnel once the addition was complete, the solution was allowed to stir for 10 minutes. Following the addition of the IBADC, 5.057 g (26.7 mmol) of $TiCl_4$ diluted in 30 mL of decane was added to the reaction via dropping funnel in one shot. After rinsing the funnel once the addition was complete, the slurry was allowed to stir for 5 minutes. 22.904 g (44 mmol) of DEAL-E diluted in 60 mL of decane was added to the reaction via dropping funnel in one shot. After rinsing the funnel once the addition was complete, the solution was slowly heated to an internal temperature of 85° C. and allowed to stir for 1 h. The heating was turned off and the solution was allowed to cool for 30 minutes. The catalyst was then filtered through a frit washing once with 130 mL decane and 2 times with 130 mL cyclohexane. The solid catalyst was transferred into a glass bottle for storage and re-slurried with approximately 350 mL of cyclohexane. Pilot plant quantities of catalyst were made in 21 batches, combined and diluted with cyclohexane. The combined catalyst slurry contained 0.1359 wt % of Ti.

Comparative Catalyst 3 (in-Line Made ZN Catalyst)

The in-line formed Ziegler Natta catalyst system (comparative catalyst 3) consisting of titanium tetrachloride ($TiCl_4$), butyl ethyl magnesium (BEM) and tertiary butyl chloride ($^tBuCl$), with an activator consisting of diethyl aluminum ethoxide (DEAL-E) was used. The BEM and TEAL were provided "premixed" (20/1 Mg/Al mole ratio). All catalyst components were mixed in the methyl pentane solvent within the Catalyst Torpedo. The mixing order was BEM/TEAL and $^tBuCl$ (Section #1); followed by $TiCl_4$ (Section #2); then followed by DEAL-E (Section #3).

$MgCl_2$ samples 1 (PFR-STR) and 2 (STR) were analyzed by GADDS and Catalyst 1 and Comparative Catalyst 1 were evaluated on the CPU (continuous polymerization unit). The CPU used a 75 mL stirred reactor and was operated between 160-280° C. for the polymerization experiments. An upstream mixing reactor having a 20 mL volume was operated at 5° C. lower than the polymerization reactor. The mixing reactor was used to pre-heat the ethylene, 1-octene and some of the solvent streams. Catalyst feeds and the rest of the solvent were added directly to the polymerization reactor as a continuous process. A total continuous flow of 27 mL/min into the polymerization reactor was maintained.

The catalysts from the examples above were added to the CPU in a slurry delivering system. The slurry delivery system consisted of an inverted 1,000 mL syringe pump with a 3,500 mL stirred slurry reservoir. Slurry was transferred from a stirred bottle, via pressure differential, through a stainless steel cannula into the 3,500 mL stirred slurry reservoir. The slurry was then diluted in the reservoir to the required concentration with purified cyclohexane. Once the slurry was transferred and diluted, it was stirred in the reservoir for a minimum of 15 minutes before any was transferred into the syringe pump. When the slurry was ready to be transferred to the reactor, an air actuated solenoid valve, which isolated the reservoir from the syringe barrel, was opened allowing slurry flow to the syringe barrel. The syringe barrel was then loaded to the desired volume at a flow of 25 mL/min, with constant stirring in the syringe barrel. When the syringe barrel was filled to the required volume, the solenoid valve to the reservoir was closed, isolating the syringe barrel from the reservoir. The syringe barrel was then brought up to the reactor pressure while still isolated from the reactor. When the syringe barrel has reached the reactor pressure, an air actuated solenoid valve (which isolated the syringe barrel from the reactor) was opened. The syringe pump was then calibrated and programmed to deliver the desired flow rate of slurry.

For the slurry catalyst experiments, copolymers were made at an 1-octene/ethylene weight ratio of 0.5. The ethylene was fed at a 10 wt % ethylene concentration in the polymerization reactor. The CPU system operated at a pressure of 10.5 MPa. The solvent, monomer, and comonomer streams were all purified by the CPU systems before entering the reactor. Q is ethylene conversion (as determined by an online gas chromatograph (GC)) and polymerization activity Kp is defined as:

$$(Kp)(HUT)=Q((1-Q)(1/\text{catalyst concentration})$$

wherein Q is the fraction of ethylene monomer converted; HUT is a reciprocal space velocity (hold up time) in the polymerization reactor expressed in minutes and maintained constant throughout the experimental program; and the catalyst concentration is the concentration in the polymerization reactor expressed in mmol of Ti per liter and Ti concentration of the slurry catalyst was determined by ICP.

All polymerization experiments were conducted at 220° C. and polymers were collected at 90±1% ethylene conversion and diethyl aluminum ethoxide (DEAL-E) to Ti molar ratio between 2 to 4.

The first reactor was a continuous stirred tank reactor (CSTR) with a volume of 24.0 liters. The second reactor was a tubular reactor having a volume of 82% of the CSTR volume (19.7 liters). Catalysts were fed into the CSTR. Monomer and solvent were split between the two reactors. An offline Ziegler Natta slurry catalyst (Catalyst 1) with an activator consisting of diethyl aluminum ethoxide (DEAL-E) were used in the experiments. For comparison of inventive Catalyst 1, two other comparative catalysts were tested in a similar manner and the in-line catalyst was tested differently. The catalyst was pumped into the reactor together with the methyl pentane solvent. The catalyst flowrate had an aim set point expressed as parts per million Ti by weight and was adjusted to maintain total ethylene conversions above 80%.

Catalyst 1 and Comparative Catalysts 1 and 2 were pumped into the continuous flow polymerization reactor using the slurry delivering system. The slurry delivery system consisted of a slurry cylinder, agitated slurry day tank, recirculation loop, slurry catalyst metering pump and solvent diluent loop. The diluted slurry catalyst was transferred from the slurry cylinder to the slurry day tank in several charges by pressurizing/sparging the cylinder with nitrogen. Once the slurry catalyst was transferred into the slurry catalyst day tank, the agitator and recirculation pump were started to keep the catalyst slurry in suspension and constant composition. The temperature of the diluted slurry catalyst was maintained at ambient temperature. Tank pressure was maintained at 300 kPag. When the slurry catalyst was ready to be transferred to the reactor, the slurry catalyst delivery pump was started and slurry catalyst was lined up to the pump. At the discharge of the slurry catalyst delivery pump, a high flow solvent diluent was used to keep the slurry catalyst in suspension and aid in delivery of the catalyst to the reactor. The diluent flowrate was maintained at 15 kg/hr.

TABLE 1

Catalyst Performance on CPU

| Catalyst | DEAL-E/Ti Molar Ratio | Ethylene Conversion (%) | Kp (1/mM*min) | Mw ($10^{-3}$) | PD | Br/ 1000 C. |
|---|---|---|---|---|---|---|
| Catalyst 1 | 2.83 | 90.9 | 70.4 | 74.6 | 3.01 | 10.3 |
| Comparative Catalyst 1 | 2.16 | 89.4 | 39.4 | N/A | N/A | N/A |
| Comparative Catalyst 2 | 2.15 | ~90 | 70.6 | 68.7 | 3.05 | 11.1 |

Testing of the inventive offline Ziegler Natta (Z/N) slurry catalyst (Catalyst 1) at the pilot plant scale continuous polymerization facility was conducted along with comparative catalyst 1 (made in STR only), comparative catalyst 2 (made in the lab with an overhead stir) and comparative catalyst 3 made through an in-line formed ZN catalyst.

Four catalysts in Table 2 were tested in the continuous flow, solution copolymerization of ethylene and 1-octene at a medium pressure using a single pilot plant reactor system.

The temperature of the solvent was controlled at 25° C. The solvent and slurry catalyst were pumped into a flow transmitter and the flow was recorded. The slurry catalyst flowrate into the reactor was calculated by the difference between the diluent flowrate and combined diluent and slurry catalyst flowrate. Slurry catalyst flows (and ppms) into the reactor are adjusted by changing the slurry catalyst delivery pump motor variable frequency drive or pump stroker. The catalyst flowrate had an aim set point expressed as parts per million Ti by weight, it was adjusted to maintain total ethylene conversions above 80%.

TABLE 2

| Catalyst | Catalyst Description | Polymerization Reactor Temperature (° C.) | Polymer NAA Ti (ppm) | Polymer NAA Cl (ppm) | Polymer MI | Polymer Density (g/mL) | Polymer S. Ex. |
|---|---|---|---|---|---|---|---|
| Catalyst 1 | Pilot plant scale slurry catalyst made in 4 batches in PFR-STR | 195.5 | 7.6 | 129.4 | 0.72 | 0.9209 | 1.31 |
| Comparative catalyst 1 | Pilot plant scale slurry catalyst made in 2 batches in STR only | 196.8 | 8.7 | 148.1 | 0.96 | 0.9218 | 1.31 |
| Comparative catalyst 2 | Lab scale slurry catalyst made in STR only | 199.5 | 7.8 | 106.5 | 1.04 | 0.9205 | 1.32 |
| Comparative catalyst 3 | In-line made ZN catalyst | 187.8 | 9.2 | 122.2 | 0.94 | 0.9204 | 1.3 |

The invention claimed is:

1. A method of making a disordered form of $MgCl_2$ comprising
combining $MgR_2$ and reactive organic chloride or HCl and a solvent chosen from $C_{5-12}$ alkanes in a plug flow reactor (PFR), wherein each R is independently chosen from $C_{2-8}$ alkyl radicals; and
operating the PFR at conditions sufficient to create the disordered form of $MgCl_2$.

2. The method of claim 1 wherein the disordered form of $MgCl_2$ is characterized by having a peak in the GADDS spectrum at 15 2 theta with a FWHM that is at least 10% greater than the FWHM of the peak at 15 2 theta for $MgCl_2$ prepared in a stirred reactor (STR).

3. The method of claim 1 wherein the disordered form of $MgCl_2$ is characterized by having a peak in the GADDS spectrum at 15 2 theta with a full width of half maximum (FWHM) that is at least 20% greater than the FWHM of the peak at 15 2 theta for $MgCl_2$ prepared in a STR.

4. The method of claim 1 wherein the mole ratio of added Cl from the organic chloride or HCl to Mg from the $MgR_2$ is from about 2.0 to about 3.0.

5. The method of claim 1 wherein the reactive organic chloride is tertiary-butylchloride ($^tBuCl$).

6. The method of claim 1 wherein $MgR_2$ is chosen from butylethyl magnesium (BEM), dibutyl magnesium, and butyloctyl magnesium (BOM).

7. The method of claim 1 wherein the solvent is isohexane, cyclohexane, or decane.

8. The method of claim 1 wherein the mole ratio of added Cl from the organic chloride or HCl to Mg from the $MgR_2$ is from about 2.15 to about 2.5.

9. The method of claim 1 wherein a STR is used in combination with the PFR.

10. The method of claim 9 wherein the PFR feeds into the STR.

11. A method for making a Ziegler Natta (pro) catalyst comprising
combining $MgR_2$ and reactive organic chloride or HCl and a solvent chosen from $C_{5-12}$ alkanes in a PFR reactor, wherein each R is independently chosen from $C_{2-8}$ alkyl radicals;
operating the PFR reactor to create a disordered form of $MgCl_2$;
contacting the disordered form of $MgCl_2$ with $^tBuAlCl_2$, $TiCl_4$ and $Et_2AlOEt$ to form the (pro)catalyst.

12. The method of claim 11 wherein the plug flow reactor is combined with at least one other reactor.

13. The method of claim 11 wherein the plug flow reactor is combined with at least one STR.

14. The method of claim 13 wherein the $^tBuAlCl_2$, $TiCl_4$ and $Et_2AlOEt$ contact the disordered form of $MgCl_2$ in the STR reactor.

15. The method of claim 11 wherein the solvent is isohexane, cyclohexane or decane.

16. A method for making polyethylene polymers and copolymers comprising
combining $MgR_2$ and reactive organic chloride or HCl and a solvent selected from $C_{5-12}$ alkanes in a PFR reactor, wherein each R is independently selected from $C_{2-8}$ alkyl radicals;
operating a PFR reactor to create a disordered form of $MgCl_2$;
contacting the disordered form of $MgCl_2$ with $^tBuAlCl_2$, $TiCl_4$ and $Et_2AlOEt$ to form the (pro)catalyst;
contacting the procatalyst of the previous step with ethylene, and optionally an alpha-olefin and operating the reactor to create the desired polyethylene polymers and copolymers.

17. The method of claim 16 wherein the plug flow reactor is combined with at least one STR.

18. The method of claim 17 wherein the $^tBuAlCl_2$, $TiCl_4$ and $Et_2AlOEt$ are added to the STR reactor and the solvent is isohexane, cyclohexane or decane.

* * * * *